United States Patent [19]
Fuller et al.

[11] Patent Number: 5,929,700
[45] Date of Patent: Jul. 27, 1999

[54] INCREASED BANDWIDTH FOR PLANTS WITH RESONANT MODES USING NONLINEAR NOTCH FILTERS

[75] Inventors: James W. Fuller, Amston; Carl N. Nett, Tolland, both of Conn.

[73] Assignee: United Technologies Corporation, Hartford, Conn.

[21] Appl. No.: 08/669,729

[22] Filed: Jun. 26, 1996

[51] Int. Cl.$^6$ ........................................ H03B 1/04
[52] U.S. Cl. ........................................ 327/556; 327/551
[58] Field of Search ........................ 327/551, 556

[56] References Cited

U.S. PATENT DOCUMENTS

| | | | |
|---|---|---|---|
| 3,241,077 | 3/1966 | Smyth et al. | 327/556 |
| 3,375,451 | 3/1968 | Borelli et al. | 327/556 |
| 3,849,020 | 11/1974 | Eastman | 415/28 |
| 3,972,641 | 8/1976 | Harner et al. | 415/28 |
| 4,195,265 | 3/1980 | Vali | 327/556 |
| 4,199,039 | 4/1980 | Ciemochowski | 180/177 |
| 4,627,789 | 12/1986 | Petro et al. | 415/28 |
| 4,679,001 | 7/1987 | West | 327/556 |
| 4,864,813 | 9/1989 | Krukoski | 60/39.29 |
| 5,315,817 | 5/1994 | Vannini et al. | 60/39.091 |
| 5,391,055 | 2/1995 | Carvalho | 416/157 A |
| 5,500,580 | 3/1996 | Tranovich | 318/568.16 |
| 5,568,022 | 10/1996 | Tranovich | 318/566 |

OTHER PUBLICATIONS

Arthur Gelb et al, "Multiple–Input Describing Functions and Nonlinear System Design," McGraw–Hill Book Company, 1968, pp. 79–81.

Isaac Horowitz et al., "Non–linear design for cost of feedback reduction in systems with large parameter uncertainty." Int. J. Control, 1975, vol. 21, No. 6, pp. 977–1001.

*Primary Examiner*—Timothy P. Callahan
*Assistant Examiner*—An T. Luu
*Attorney, Agent, or Firm*—Gerald L. DePardo

[57] ABSTRACT

A control system includes a plant 56 having resonant modes and a controller 5 which receives plant input signals on lines 14,24 from the plant 56 and provides a controller output signal I, related to a filter output signal V, which controls the plant 6. The controller is provided with a non-linear notch filter 30 which receives a filter input signal x related to the plant input signals and provides the filter output signal V. The notch filter has at least one notch frequency near one of the resonant modes so as to attenuate one of the modes by a predetermined amount and has a phase lag a decade below the lowest notch frequency of said notch filter which is less than that of a corresponding linear notch filter, thereby allowing the control system 7 to exhibit faster time response and increased bandwidth than a system employing linear notch filters.

20 Claims, 6 Drawing Sheets

INCREASED BANDWIDTH FOR PLANTS WITH RESONANT MODES USING NONLINEAR NOTCH FILTERS

CROSS REFERENCE TO RELATED APPLICATIONS

U.S. Pat. No. 5,694,077, entitled "Reduced Phase-Shift Nonlinear Filters", filed contemporaneously herewith, contains subject matter related to that disclosed herein.

1. Technical Field

This invention relates to control systems having plants with resonances and more particularly to increased bandwidth for such control systems using nonlinear notch filters.

2. Background Art

Many control systems, such as actuation mechanism or servo-mechanism systems, require very fast and responsive control of a plant. This requires that the closed loop control system (including the controller and the plant) have a high bandwidth or fast response time. A major difficulty in increasing the bandwidth of a control system exists when the plant contains lightly damped (or high Q) oscillatory (or resonant) modes which occur at resonant or natural frequencies of the plant. If these resonant frequencies exist at a low enough frequency and/or if the gain of the controller is increased too high (in an attempt to increase the system bandwidth), such resonances will destabilize the control loop.

A common way to prevent such destabilization is to include one or more linear notch filters in the controller for each oscillatory mode whose resonant frequency is within an order of magnitude (one decade) of the bandwidth of the control system.

Notch filters, as is known, are filters which attenuate input frequencies over a predetermined narrow frequency range. The transfer function of such filters are typically in the form of a quadratic (or second order) equation in the numerator and a quadratic equation in the denominator. However, one problem with notch filters is that they also cause a phase shift between the input and output signals at certain frequencies. In particular, the frequency response of a notch filter exhibits significant phase lag up to a decade (or more) below the natural (or resonant or notch) frequency of the filter. The amount of phase lag a decade below the notch frequency is determined primarily by the extent of the frequency range over which the notch filter must provide attenuation. The narrower this range, the higher the "Q" of the filter, and the less the phase lag that exists one decade below the notch frequency. Uncertainty and variability of the oscillatory mode natural frequencies of the plant limit how narrow the notch band can be, and this dictates the lower frequency phase lag.

In order to tolerate the phase shift associated with the required gain variations of the notch filter in the controller, the gain of the controller must be reduced, thereby reducing the overall control system bandwidth (and the responsiveness of the system). Thus, control systems having resonances in the plant have limited performance characteristics.

Thus, it would be desirable to provide a closed loop control system which provides increased bandwidth or time response when the plant has resonant modes (or resonances).

DISCLOSURE OF INVENTION

Objects of the invention include provision of a highly responsive control system with a plant having resonant modes.

According to the present invention a control system comprises a plant having resonant modes; and a controller which receives a plant input signal from the plant and a command signal and provides a controller output signal, related to a filter output signal, which controls the plant, comprising a non-linear notch filter which receives a filter input signal related to the plant input signal and the command signal and provides the filter output signal and the notch filter having at least one notch frequency near one of the resonant modes and a magnitude frequency response so as to attenuate the one of the resonant modes by a predetermined amount and having a phase lag below the lowest notch frequency of the notch filter which is less than that of a corresponding linear notch filter.

According further to the present invention the phase lag of the non-linear notch filter allows for increased responsiveness of the control system.

The present invention represents a significant improvement over the prior art by employing non-linear notch filters in the controller compensation of a control system with a plant having resonant modes. Such a non-linear notch filter has substantially the same gain variations with frequency as a linear notch filter, but with much less phase lag below the notch frequency. As a result, the control system of the present invention increases bandwidth and, thus, the responsiveness of control systems with resonant plants, such as valve actuation systems, by 50% (or more) over prior art systems which utilize linear notch filters. Such a control configuration greatly improves the feasibility and performance of controlling resonant plants which require fast response. Also, the invention provides reduced closed loop phase lag, which when placed within a higher level (outer loop) control system allows such higher level system to also be more responsive.

The foregoing and other objects, features and advantages of the present invention will become more apparent in light of the following detailed description of exemplary embodiments thereof as illustrated in the accompanying drawings.

BEST MODE FOR CARRYING OUT THE INVENTION

Figure 1:
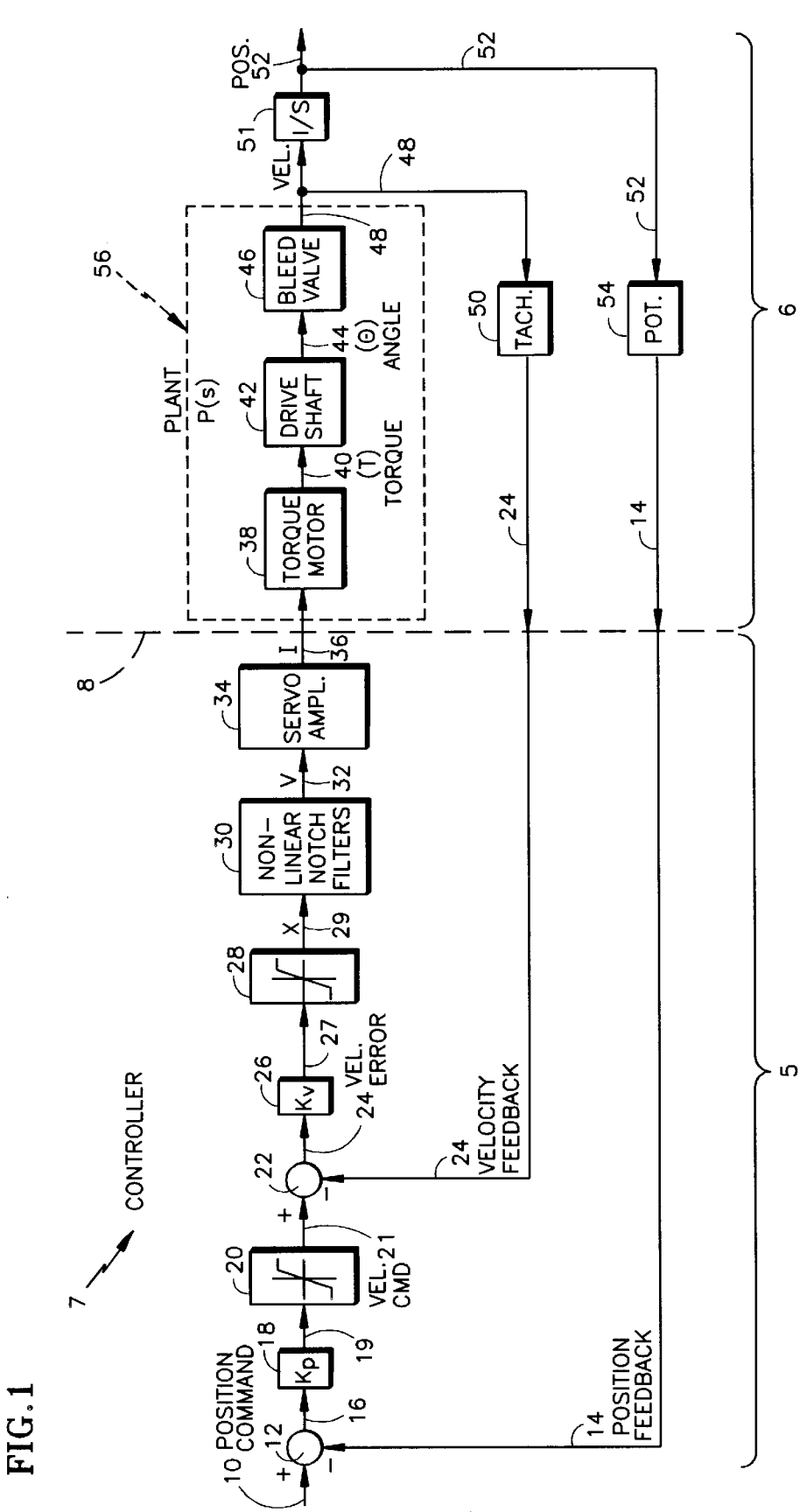
FIG. 1 is a control system block diagram of an actuator control loop having a controller with non-linear notch filters and a plant with resonances, in accordance with the present invention.

Referring to FIG. 1, an actuator control system 7 is provided with an electronic controller 5, to the left of a dashed line 8, and a plant or system to be controlled 6, to the right of the line 8. In particular, a valve position command is provided on a line 10 to a positive input of a summer 12. A valve position feedback signal (discussed more hereinafter) is provided on a line 14 to a negative input of the summer 12. The summer 12 provides a position error signal indicative of the position command minus the position feedback, on a line 16. The position error signal is fed to a position gain 18 which multiplies the position error signal by a predetermined position error gain Kp having a value of, e.g., 1.84 msec$^{-1}$, and provides a velocity command on a line 19. The velocity command on the line 19 is fed to a magnitude limiter 20 which limits the positive and negative values of the command signal to limits of ±8.4 deg/msec, and provides a limited velocity command signal on a line 21.

The limited velocity command signal is fed to a positive input of a summer 22. A velocity feedback signal (discussed more hereinafter) is provided on a line 24 to a negative input of the summer 22.

The summer 22 provides a velocity error signal indicative of the velocity command minus the velocity feedback, on a line 24. The velocity error signal is multiplied by a velocity error gain 26 (Kv) having a value of, e.g., 4.29 msec$^{-1}$, which provides an acceleration signal on a line 27. The signal on the line 27 is fed to a magnitude limiter 28 which limits the positive and negative values of the acceleration signal to predetermined limits, e.g., ±4.09 deg/msec$^2$, and provides a limited acceleration signal on a line 29. The limited acceleration signal is fed to non-linear notch filter compensation logic 30 (discussed hereinafter) which attenuates specific frequency bands of the acceleration signal by predetermined amounts, and provides a filtered voltage signal V on a line 32.

Other values for the gains Kv,Kp and the magnitude limits may be used if desired.

The voltage signal on the line 32 is provided to a servo amplifier 34 (servo amp) which converts the voltage signal V to a current output signal I on a line 36. The transfer function for the servo amp 34 is a standard first order lag having the form:

$$K_1/(s+\omega_1)$$

where the gain $K_1$=65345, and the break frequency $\omega_1$=40841 rad/sec. A servo amp having a different gain and/or break frequency, or transfer function, may be used if desired.

The current I on the line 36 is provided to a known torque motor 38 (or armature controlled dc motor) which provides an output torque T on a line 40 which is proportional to the input current I on the line 36. The torque T from the torque motor 38 drives an output or drive shaft 42 connected thereto which results in an angular displacement of the shaft 42 as indicated by a signal θ on a line 44. The shaft 42 is connected to a valve 46, e.g., a bleed valve, or other type of load, having a predetermined moment of inertia, viscous friction, and/or other dynamic characteristics.

In response to the change in angular displacement θ of the motor drive shaft 42, the valve 46, acting through its dynamics, exhibits a velocity (degrees/millisecond) of the valve 46 as indicated by a valve velocity signal on a line 48. The valve velocity signal on the line 48 is fed to a speed sensor 50 (e.g., a tachometer) which provides a velocity feedback signal on the line 24 which is fed to the negative input of the summer 22 of the controller as velocity feedback (as discussed hereinbefore).

The velocity signal on the line 48 is also provided to an integrator 51 which represents the relationship between valve velocity and valve position, and provides a valve position signal on a line 52. The valve position is measured by a position sensor 54 such as a potentiometer, and provides a position feedback signal (in degrees) on line 14 which is fed to the negative input of the summer 12 of the controller (as discussed hereinbefore).

Figure 2:
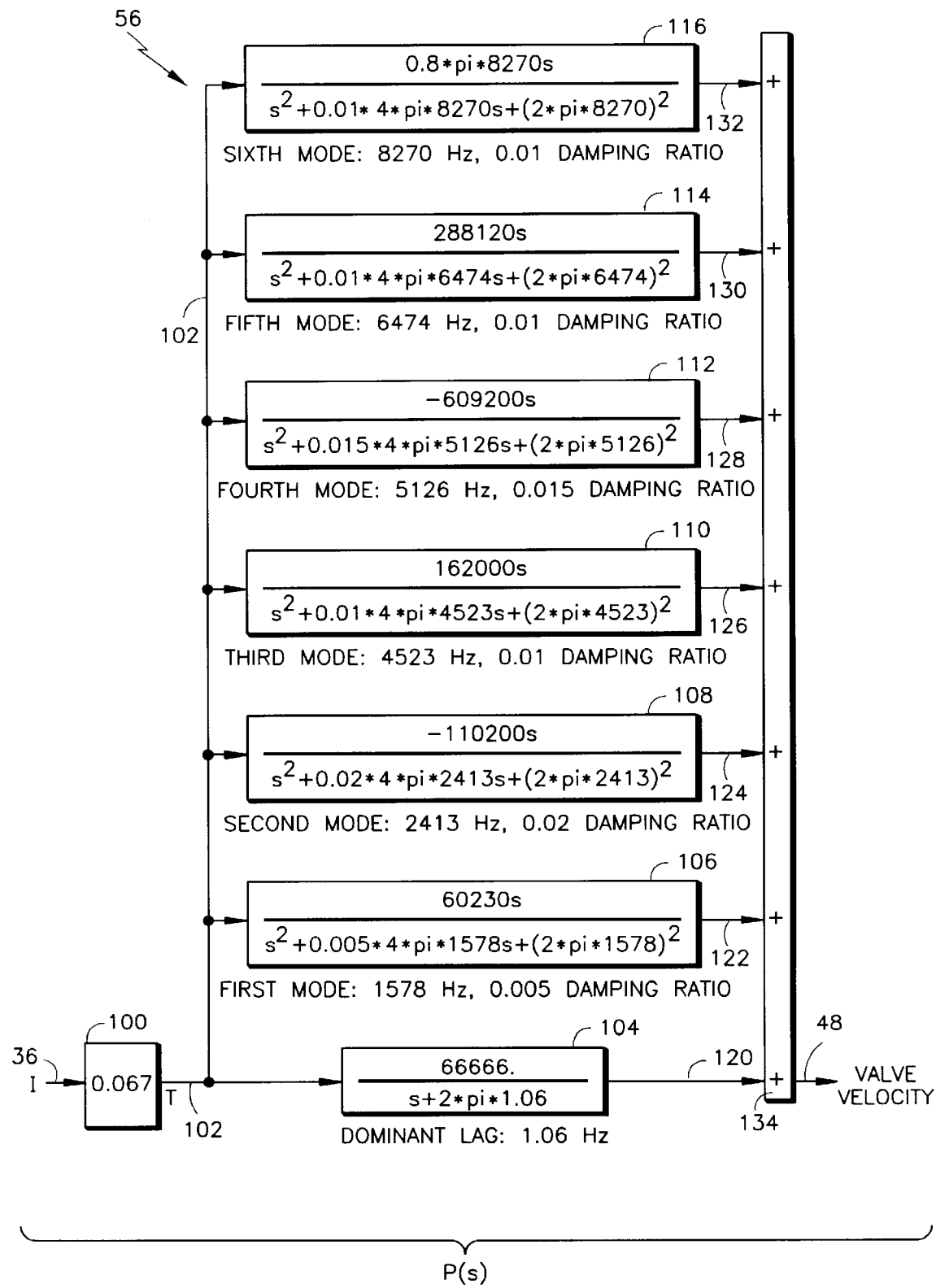
FIG. 2 is a control system transfer function block diagram of a portion of the plant of FIG. 1, in accordance with the present invention.

Referring now to FIG. 2, the overall transfer function P(s) of a portion 56 of the plant of FIG. 1 comprising the torque motor 38, the drive shaft 42, and the bleed valve 46, is described in more detail. The current I enters the transfer function P(s) on the line 36 and is multiplied by a gain 100 having a value of, e.g., 0.067, which represents the conversion from current I to torque T by the motor. The torque signal T is provided on a line 102 to a parallel combination of polynomials 104–116 which, when summed together by a summer 134, make up the overall transfer function P(s) from current I to valve velocity. The transfer function P(s) is represented in "modal" form which is a known form of representing transfer functions showing the poles (or roots or eigenvalues) of the overall transfer function P(s) expressed by the equations in the denominator of each of the polynomials 104–116. The numerators of the polynomials are not critical to the discussion and do not individually represent the zeros of the complete transfer function P(s) but merely components thereof, as is known.

The transfer function P(s) exhibits a first order dominant lag 104 and six resonant mode polynomials 106–116. The transfer function for the first order lag 104 is a standard first order lag having a form:

$$Ka/(s+\omega a) \qquad [\text{Eq. 1}]$$

where ωa(break frequency)=1.06 Hz; and Ka=66666.

The quadratic equations in the denominators of the polynomials 106–116 have the form of a standard quadratic equation of the form:

$$s^2+\xi 2\omega ns+\omega n^2 \qquad [\text{Eq. 2}]$$

where ωn (rad/sec) is the resonant frequency, ξ is the damping ratio, and ωn=2πfn(Hz).

In particular, the first resonant mode 106 of the system exists at $fn_1$=1578 Hz and has a damping ratio of $\xi_1$=0.005, the second resonant mode 108 of the system has a resonant frequency of $fn_2$=2413 Hz and a damping ratio of $\xi_2$=0.02, the third resonant mode 110 of the system exists at $fn_3$=4523 Hz with a damping ratio of $\xi_3$=0.01, the fourth resonant mode 112 of the system has a resonant frequency at $fn_4$=5126 Hz and a damping ratio of $\xi_4$=0.015, the fifth resonant mode 114 of the system has a resonant frequency at $fn_5$=6474 Hz and a damping ratio of $\xi_5$=0.01, and the sixth resonant mode 116 of the system has at a resonant frequency of $fn_6$=8270 Hz and a damping ratio of $\xi_6$=0.01. The output signals from the polynomials 104–116 are fed on lines 120–132, respectively, to positive inputs of the seven-input summer 134. The output of the summer 134 is the valve velocity on the line 48.

It should be understood that the resonant frequencies, number of resonant modes, and the damping for each of the modes will likely be different for each type of plant to be controlled. In particular, for a servo controller, the type of motor, drive shaft, and load used, as well as the amount of viscous friction and inertia of each of the components will determine the values of such parameters.

Figure 3:
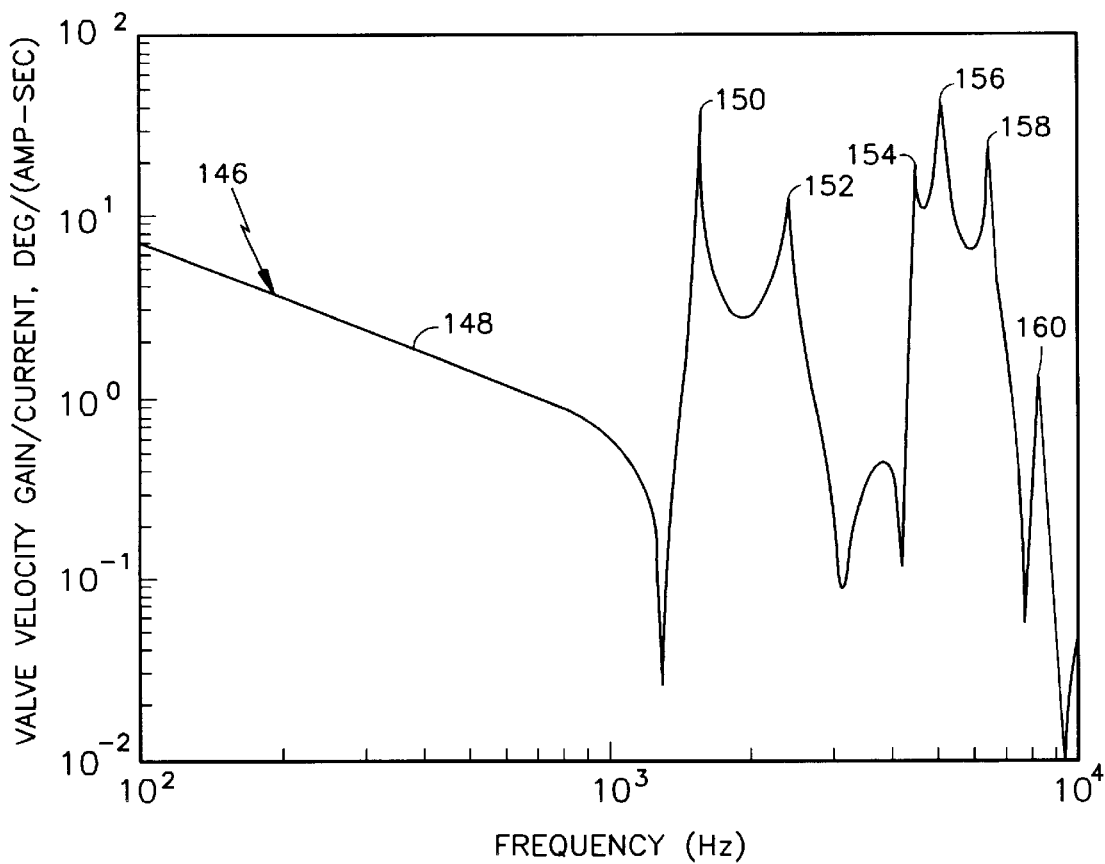
FIG. 3 is a graph of magnitude frequency response of the transfer function of FIG. 2, in accordance with the present invention.

Referring now to FIG. 3, an approximate illustrative magnitude frequency response curve 146 for the transfer function P(s) (FIG. 2) of the portion 56 (FIG. 1) is shown. The dominant lag transfer function 104 (FIG. 2) is indicated by a decreasing region 148 which begins at the break frequency ωa of about 1.06 Hz (not shown) and decreases at a slope of −20 dB/decade.

The magnitude curve 146 of FIG. 3 also shows a series of resonant peaks 150–160 protruding upwardly from the slope of the lag function, which represent the resonant modes 106–116, at the frequencies $fn_1$–$fn_6$, respectively, discussed hereinbefore with FIG. 2.

The resonant peaks 150–160 ($fn_1$–$fn_6$), corresponding to the first six resonant modes, respectively, have peaks high enough and are at a frequency close enough to the bandwidth of the system to cause the system to exhibit instabilities if the gain of the controller is increased too high. Accordingly, notch filters are provided in the compensation logic of the controller to cancel the effect of these resonances 150–160, i.e., to attenuate signals in the frequency band around each of the modes $fn_1$–$fn_6$. The width and depth of the notch filters around the resonant modes $fn_1$–$fn_2$ are chosen so as to provide sufficient attenuation at these frequencies plus-or-minus a certain percentage (robustness range) to allow for changes in the system loading and environment. In particular, for the actuator system described herein, the notch filter at $fn_1$ is required to provide at least a factor of 20 gain reduction within ±5% of $fn_1$ (1578 Hz) resonant frequency and at least a factor of 10 reduction within ±5% of $fn_2$ (2413 Hz) resonant frequency. Also, in order to provide maximum gain and maximum high speed response, the notch filter phase lag below 1000 Hz should be minimal. Other robustness ranges and attenuation criteria may be used if desired depending on the application and the performance requirements.

The notch filters for the first two resonances will cause most of the low frequency phase lag at lower frequencies, because they have the lowest notch frequencies. Therefore, this invention will be demonstrated by use of a non-linear notch filter for these first two modes $fn_1$,$fn_2$.

One such notch filter design which provides the aforementioned characteristics for canceling the resonant frequencies $fn_1$,$fn_2$ of the plant is a cascade of three second order notch filters, two at 1553 Hz (a double notch) and one at 2413 Hz, having the following overall transfer function:

$$G(s)=G_1(s)*G_2(s)*G_3(s) \qquad [\text{Eq. 3}]$$

where $G_1(s)=(s^2+2\xi_{n1}\omega_1 s+\omega_1^2)/(s^2+2\xi_1\omega_1 s+\omega_1^2);$ $G_2(s)=(s^2+2\xi_{n2}\omega_2 s+\omega_2^2)/(s^2+2\xi_2\omega_2 s+\omega_2^2);$ $G_3(s)=(s^2+2\xi_{n3}\omega_3 s+\omega_3^2)/(s^2+2\xi_3\omega_3 s+\omega_3^2);$ and where $\omega_1=\omega_2=2*\pi*1553$, $\omega_3=2*\pi*2413$, $\xi_1=0.167$, $\xi_2=0.33$, $\xi_3=0.5$, $\xi_{n1}=\xi_{n2}=\xi_{n3}=0$, and $\omega=2*\pi*f$. Other values for $\omega_1$, $\omega_2$, $\omega_3$, $\xi_1$, $\xi_2$, and $\xi_3$, may be used if desired. Also, instead of using zero damping terms ($\xi_{n1}=\xi_{n2}=\xi_{n3}=0$) in the numerator of the notches, a non-zero damping term may be used for one or more of the notches ($G_1,G_2,G_3$) to achieve the desired attenuation over the desired frequency range. Furthermore, any transfer function form for any linear notch filter meeting the desired attenuation goals may be used. The notch frequency $\omega_1=\omega_2=2*\pi*1553$ Hz is offset from the resonance at $fn_1=1578$ Hz to simulate about a 1.5% difference between the plant resonance frequency $fn_1$ (1578 Hz) and the notch frequency (1553 Hz), to test the required robustness range (as described hereinbefore).

Figure 4:
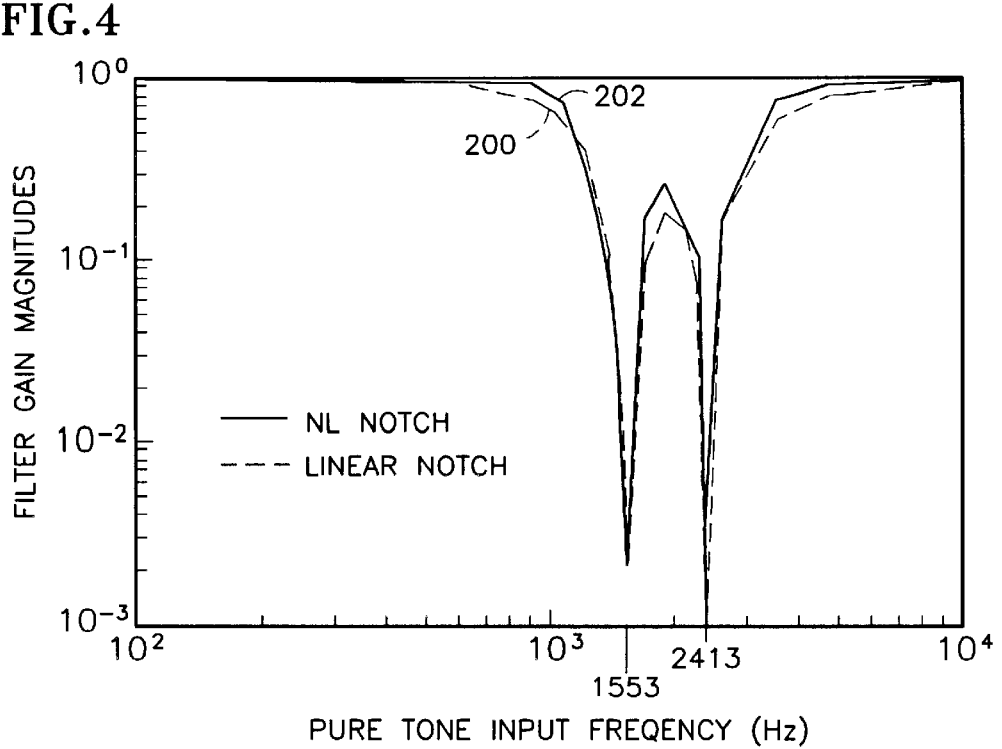
FIG. 4 is a graph of magnitude frequency response of linear and non-linear notch filters, in accordance with the present invention.

Referring now to FIG. 4, a magnitude frequency response for the notch filters of Eq. 3 using conventional prior art linear notch filters is shown by a dashed curve 200 and using non-linear notch filters of the present invention is shown by a solid curve 202 (for a first harmonic response). The curves 200,202 exhibit substantially similar magnitude response profiles.

Figure 5:
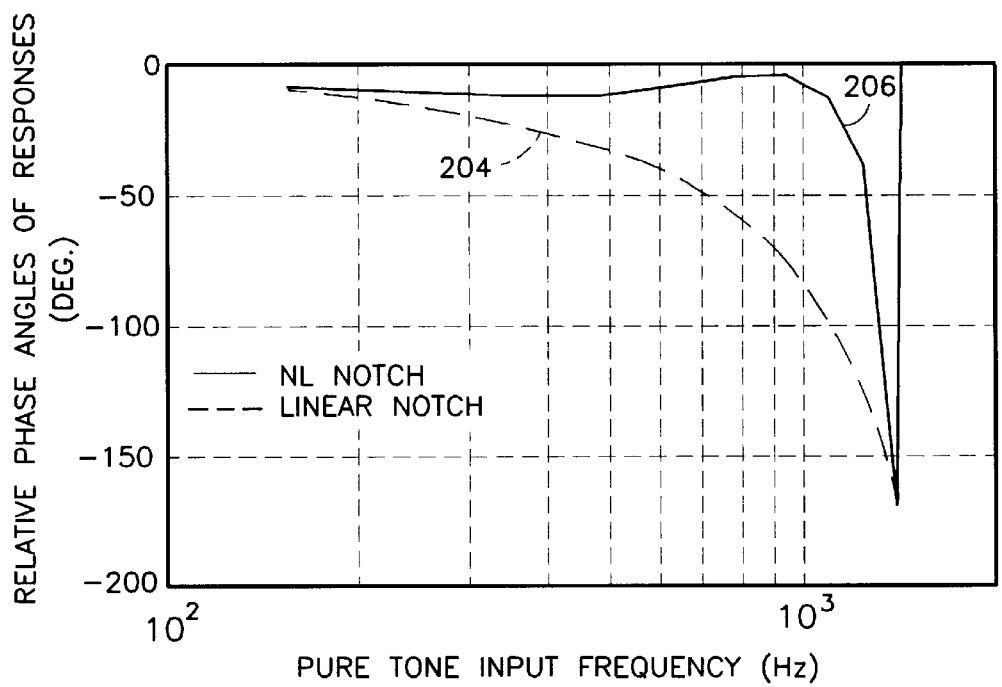
FIG. 5 is a graph of phase frequency response of linear and non-linear notch filters, in accordance with the present invention.

Referring now to FIG. 5, the phase frequency response for the filter of Eq. 3 using a conventional prior art linear notch filter is shown by a dashed curve 204 and using a non-linear notch filter of the present invention is shown by a solid curve 206 (for a first harmonic response), for a frequency range up to 1553 Hz. This frequency range is important for the control system design as discussed hereinbefore because the notch filter phase lag below about 1000 Hz should be minimized.

As can be seen by comparison of the curves 204,206, the present invention exhibits reduced phase shift from that exhibited by prior art linear filters. Such reduced phase is especially desirable over the frequency range typically of interest for a notch filter, e.g., from the lowest notch frequency $\omega_n$ of the filter down to about a decade (or more) below such notch frequency ($\omega_n/10$). The portion of this range which reduced phase lag is desired may vary for each application. Table I below shows a comparison of phase lag for the linear and nonlinear filters as shown in FIG. 5.

TABLE I

| | Frequency (Hz) | | | | | | | | | | |
|---|---|---|---|---|---|---|---|---|---|---|---|
| | 200 | 300 | 400 | 500 | 600 | 700 | 800 | 900 | 1000 | 1100 | 1200 |
| Lin | 12.3 | 18.6 | 25.3 | 32.5 | 40.3 | 48.9 | 58.6 | 69.8 | 83.0 | 98.7 | 118. |
| Non-Lin | 9.0 | 11.1 | 11.9 | 11.2 | 9.0 | 6.5 | 4.4 | 3.9 | 6.5 | 13.0 | 27.1 |

Such reduced phase lag at frequencies below the notch frequency $\omega_n$ is an important advantage of the present invention over the prior art. In particular, phase lags of less than 15°, within the desired controlled actuator (closed loop) bandwidth, are desirable for a notch filter, to ensure good feedback control performance. The phase lag of the linear notch filter is greater than 15° for frequencies above 243 Hz whereas the nonlinear filter lag is greater than 15° for frequencies above 1114 Hz. Thus, the non-linear notch filter allows for a higher loop gain, and, thus, a faster actuator controller to be designed and higher controlled actuator (closed loop) bandwidth, than achievable with the prior art linear notch filter.

Figure 6:
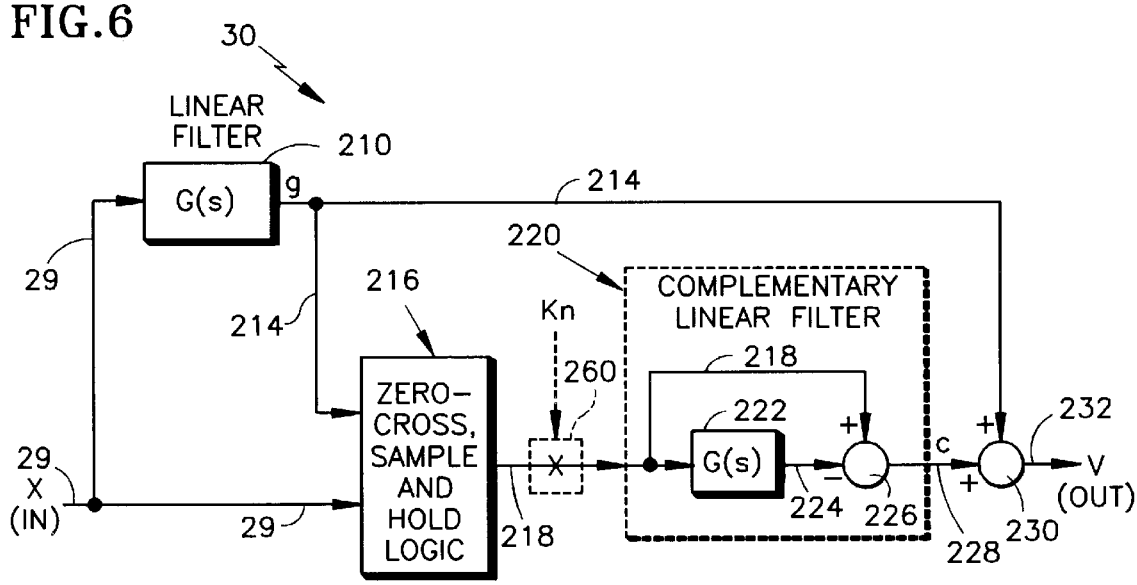
FIG. 6 is a block diagram of a non-linear notch filter of the controller of FIG. 1, in accordance with the present invention.
Figure 7:
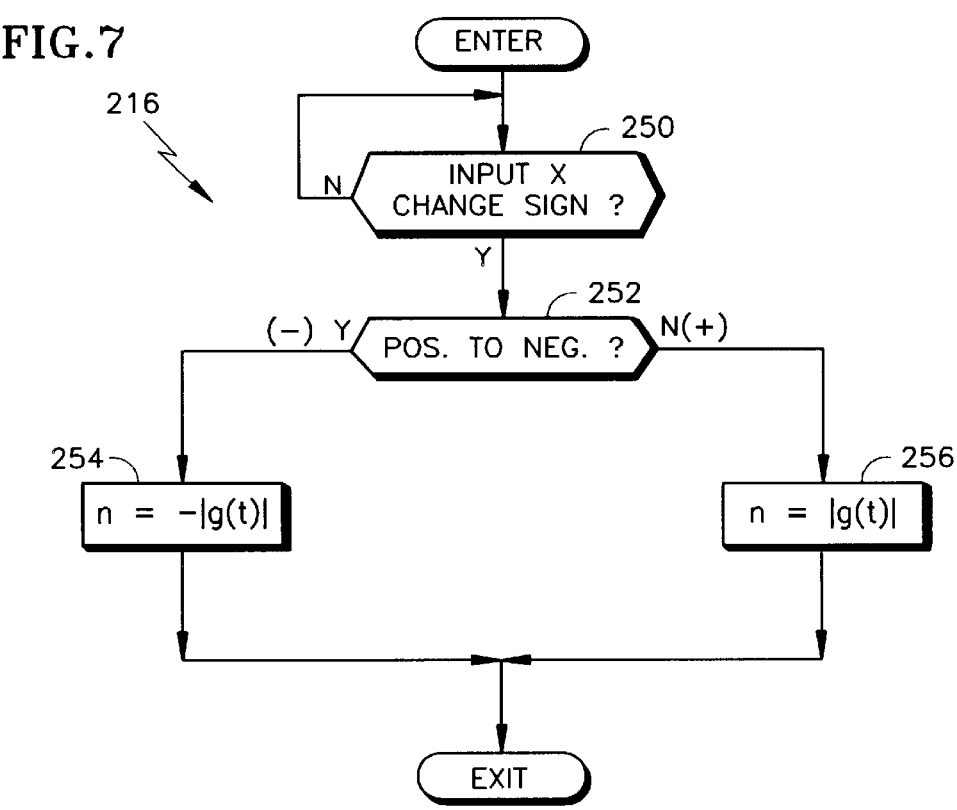
FIG. 7 is a flow diagram of zero-crossing, sample-and-hold logic, in accordance with the present invention.

Referring now to FIGS. 6 and 7, the nonlinear notch filter compensation used for the present invention is designed similar to that discussed in Copending U.S. Patent Application Ser. No. (UTC Docket No. R-3973), entitled "Reduced Phase-Shift Nonlinear Filters", filed contemporaneously herewith, where G(s) is as described hereinbefore with Eq. 3.

In particular, the reduced phase-shift non-linear notch filter 30 includes linear filter logic 210 having the transfer function G(s) of Eq. 3 which receives an input signal x on the line 29. The linear filter logic 210 provides an output signal g on a line 214 indicative of the response of the linear filter transfer function G(s) to the input signal x. The signal g is fed to zero-cross, sample-and-hold logic 216. The zero-cross, sample-and-hold logic 216 also receives the input signal x on the line 29. The logic 216 samples the signal g when the input signal x crosses zero and provides a signal n on a line 218 which is a square wave signal which crosses zero at the same time as and in the same direction as the input signal x and has an amplitude equal to the signal g at the time of sampling, as discussed more hereinafter.

The signal n on the line 218 is fed to complementary linear filter logic 220, which is configured as a complementary configuration of the linear filter transfer function G(s), i.e., 1−G(s). In particular, if the linear filter 210 and the complementary filter 220 were driven by a common input signal and their outputs were added together, the resultant output would be one at all times and for all frequencies (i.e., G(s)+(1−G(s))=1). For G(s) being the notch filters of Eq. 3, the transfer function for the complementary linear filter 20 is a second order narrow bandpass filters (1−G(s)).

Within the complementary filter logic 220 the line 218 is fed to another linear filter 222 having a transfer function G(s), the same as the linear filter function 210 discussed hereinbefore. The output of the filter 222 is provided on a line 224 which is fed to the negative input of a summer 226. The line 218 is also fed to a positive input of the summer 226. The output of the summer 226 is provided on a line 228 which is the output signal c of the complementary linear filter logic 220.

The signal c on the line 228 is fed to a positive input of a summer 230. The signal g from the linear filter 210 on the line 214 is also provided to another positive input of the summer 230. The summer 230 provides the output signal V on the line 32 which is the output of the reduced phase shift non-linear filter logic 30.

Referring now to FIG. 7, the zero-cross, sample-and-hold logic 216 samples the input signal x on the line 29 at a predetermined rate, e.g., 100K Hz, and determines at a step 250 whether the input signal x has changed sign (i.e., whether it has crossed through zero). If not, the input signal x is sampled again at the next sample time. If the input has changed sign, a step 252 determines if the change in sign was from positive to negative. If the change was from positive to negative, a step 254 sets the value of n to the negative of the absolute value of g at the time the sampling occurred and the logic 216 is exited. Conversely, if the change in sign of the input signal x is from negative to positive (i.e., not from positive to negative) a step 256 sets the value of n to the absolute value of g and the logic 216 is exited. In either case, the value of n is held constant until the next sampling event.

Accordingly, the sampling of the linear filter output signal g (and the updating of the signal n) occurs only at the instant that the filter input signal x crosses zero and the sign of n is set based on the direction that the input signal x crosses through zero and equal to the value of g at that time. Thus, the signal n is a square wave function which crosses zero at the same time and in the same direction as the input signal x and has an amplitude equal to the value of the signal g at that time.

Other sample rates for the input signal x may be used if desired or sampling may be continuous as in an analog system. However, it should be understood that independent of the sample rate of x, the time at which the signal g is sampled is when the logic detects that the input signal x crosses zero. Also, other digital logic or software, and/or analog circuits may be used if desired to achieve the same result for the signal n.

It should be understood that because n is a square wave type function, it is composed of odd harmonic frequency components. As a result, the response of the complementary filter will exhibit such odd harmonics of the input square wave and thus the output signal y will exhibit such harmonics. However, the magnitude of these harmonics naturally decreases with frequency. Also, because the complementary filter function 1−G(s) is a band pass about the desirable first harmonics, it further attenuates the higher harmonics in a notch filter.

Figure 8:
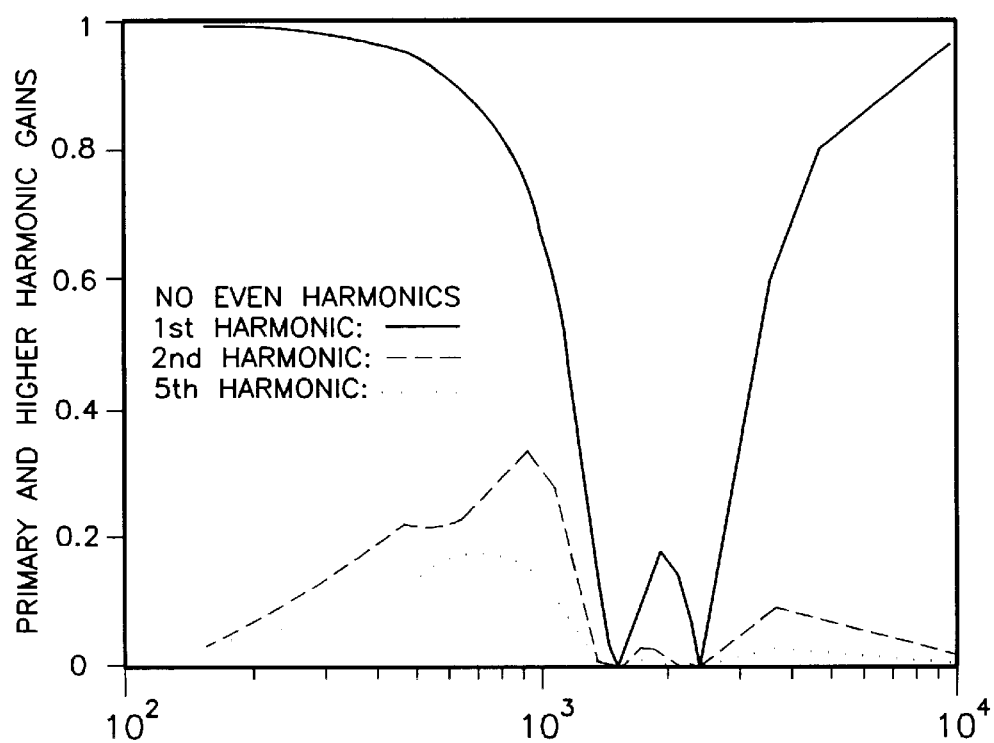
FIG. 8 is a graph of harmonic content of a non-linear notch filter, in accordance with the present invention.

Referring now to FIG. 8, in particular, the output signal V of the filter 30 contains higher harmonics in addition to the first harmonic signal. The relative amplitudes of the first, third, and fifth harmonics of the output signal V for a pure sinusoidal input are shown in FIG. 8. No even harmonics are present in the output signal V. The first harmonic is the same as that shown in the magnitude plot of FIG. 4, curve 202, but on a linear vertical scale. The third and fifth harmonics are small enough such that they are not likely to degrade actuator performance.

Alternatively in FIG. 6 the signal n may be multiplied by a gain Kn as indicated by an optional multiplier 260. In that case, the value of Kn is set so as to set the amplitude of the square wave signal n to be a predetermined ratio of the signal g at the sample time. This allows the amount of phase shift reduction to be adjusted (decreased) and the amount of non-linearity (harmonic distortion) of the output signal to be decreased. For example, if Kn=0.5, there would be less phase shift reduction but the output signal would exhibit decreased higher harmonic amplitudes. For the illustrations shown herein, the gain Kn is set to one.

Figure 9:
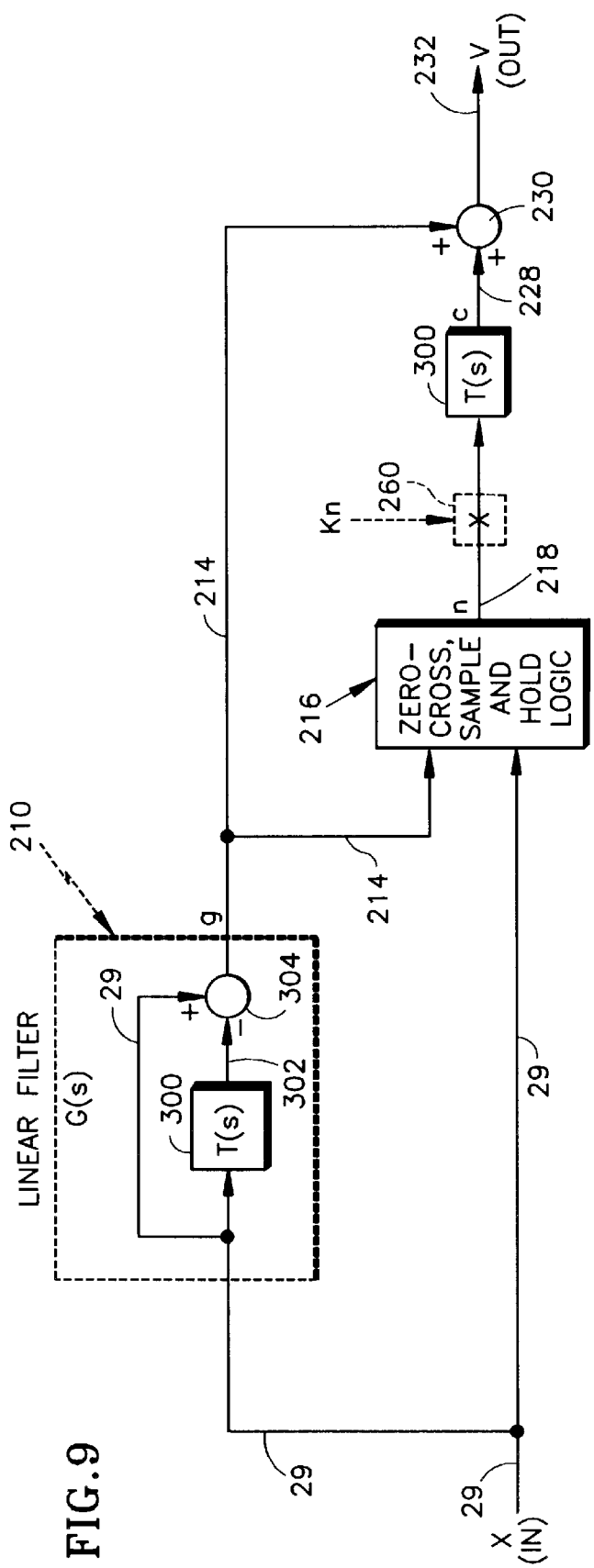
FIG. 9 is a block diagram of an alternative embodiment of a non-linear notch filter, in accordance with the present invention.

Referring now to FIG. 9, when the transfer function G(s) has the same order in both the numerator and the denominator and both approach the same value at high frequency (i.e., the transfer function has a value of one at high frequencies), as in Eq. 3, the transfer function G(s) may be rewritten in the form:

$$G(s)=1-T(s)$$

where T(s) is a transfer function having a reduced order numerator. In that case, the block diagram of FIG. 6 may be simplified as shown in FIG. 9. In particular, within the linear filter logic 210, the input signal x on the line 29 is fed to reduced order linear filter logic 300 having the transfer function T(s). The logic 300 provides a signal on a line 302 to a negative input of a summer 304. The input signal x on the line 29 is also fed to a positive input of the summer 304. The summer provides the signal g (response to the linear filter G(s)) on the line 214. It should be understood that the linear filter logic 210 may be implemented as the transfer function G(s) if desired. However, using the 1−T(s) form allows for a lower order transfer function to be used for this logic.

Also, the complementary filter transfer function 1−G(s) is simplified to T(s) when the substitution G(s)=1−T(s) is made, i.e., 1−(1−T(s))=T(s). Accordingly, in FIG. 9, the complementary filter logic 220 is simplified to merely the reduced order transfer function T(s) logic 300.

For example, for a notch filter having a transfer function:

$$G(s)=(s^2+2\xi_1\omega_n s+\omega_n^2)/(s^2+2\xi_2\omega_n s+\omega_n^2)$$

G(s) may be re-written as follows:

$$G(s)=1-2\xi_3\omega_n s/(s^2+2\xi_2\omega_n s+\omega_n^2)=1-T(s)$$

where $\xi_1=\xi_2-\xi_3$ and $T(s)=2\xi_3\omega_n s/(s^2+2\xi_2\omega_n s+\omega_n^2)$.

Thus, T(s) has a numerator having one lower order (i.e., power of s) than the denominator, which may likely be simpler to implement in hardware and/or software than the second order numerator of G(s). Such a simplification may be made with any transfer function where the numerator and denominator have the same order (highest power of s), such as the notch filters discussed herein.

Alternatively, as discussed hereinbefore with FIG. 6, the signal n may be multiplied by the gain Kn as indicated by the optional multiplier 260. In that case, the value of Kn is set so as to set the amplitude of the square wave signal n to be a predetermined ratio of the signal g at the sample time. This allows the amount of phase shift reduction to be adjusted (decreased) and the amount of non-linearity (harmonic distortion) of the output signal to be decreased. For example, if Kn=0.5, there would be less phase shift reduction but the output signal would exhibit decreased higher harmonic amplitudes.

Further, the optional gain Kn discussed in FIGS. 6 and 9 may instead be placed on the line 214 between the linear filter block 210 and the zero-cross, sample and hold logic 216, so as to gain shift the signal g prior to sampling by the logic 216, if desired.

As discussed in more detail in the aforementioned Copending Patent Application, the logic 30 (FIGS. 1,6,9) or any portion(s) thereof may be implemented in digital and/or analog hardware logic or by a digital computer in software and/or an analog computer.

Also, as discussed in the aforementioned Copending Patent Application, it should be understood that the gains of the various filters of the present invention in the passband frequency range and/or at high frequencies (such as for the reduced order transfer function of FIG. 9) can be made other than one by scaling both the linear filter transfer function and the corresponding complementary filter transfer function. Further, in general, the filter gains may be set to any value by scaling both the linear filter transfer function and the corresponding complementary filter transfer function.

The present invention provides high bandwidth valve actuator control logic for various different types of systems. In prior art systems which use linear notch filters, the system bandwidth is limited to less than desired levels due to the low frequency phase lag of the linear notch filters. When the linear notch filters are replaced with nonlinear notch filters, the reduction in phase lag allows the controller gains Kp,Kv to be increased, thereby increasing the actuator bandwidth as desired.

In particular, a linear filter controller equivalent to the control logic 30 (FIG. 1) for the plant described in FIG. 2 may employ seven linear notch filters to cancel the six resonant modes. Three of the notch filters being the cascade of three second order notch filters, two at 1553 Hz and one at 2413 Hz, having the transfer function of Eq. 3 discussed hereinbefore. The remaining four notch filters, one for each of the remaining modes, $fn_3$–$fn_6$ each have a form:

$$(s^2+2\xi_1\omega_n s+\omega_n^2)/(s^2+2\xi_2\omega_n s+\omega_n^2)$$

where $\xi_1=0$ for all four notch filters, $\omega_n$=4412, 5055, 6166, 8270 rad/sec, and $\xi_2$=0.1667, 0.4, 0.5, 0.5 for the four notch filters corresponding to the modes $fn_3$–$fn_6$. Other values for $\xi_1,\xi_2,\omega_n$ for each of the modes, or other filter forms may be used if desired. For these four notch filters, the amount of phase reflected back to the range of interest (below 1000 Hz) is minimal. Also, it may be possible to eliminate some of the notch filters provided the desired performance requirements can still be achieved.

Such a linear filter controller may be converted into a non-linear filter controller by performing the following steps: (1) Replace the first three notch filters of Eq. 3 (which attenuate resonant modes at $fn_1,fn_2$) with the nonlinear notch filters discussed hereinbefore. (2) Increase the gains Kp,Kv until an open loop gain margin is obtained which matches that of the system using linear filters. In this example, a gain margin of 3 dB was used, which corresponded to a 45% increase in loop gain. (3) Reduce the velocity command limit 20 (FIG. 1) so that the amount of overshoot to a step valve position command of 15° (50% of the full range) is approximately equal to that of the actuator when using linear notch filters. In this example, the limit was reduced from ±9 to ±8.4 deg/millisecond.

It should be understood that because the higher resonant modes ($fn_3$–$fn_6$) are far enough away from the desired system bandwidth, the type of notch filters used (linear vs. non-linear) for these resonances $fn_3$–$fn_6$ does not significantly impact the phase lag of the controller at the frequencies of interest, i.e., below 1000 Hz. However, they may also be converted to non-linear form if desired.

The improvements in the closed loop actuator control system time response to a step input, obtained by using the nonlinear filter compensation as compared to the linear filter compensation, is shown in Table II below.

TABLE II

| | Linear Response | | | Non-Linear Response | | |
|---|---|---|---|---|---|---|
| Step Size | 0–95% RisTime | % O/S | 95% StlTime | 0–95% RisTime | % O/S | 95% StlTime |
| 1% | 1.18 ms | 1.16 | 3.56 ms | 0.89 ms | 1.27 | 8.27 ms* |
| 10% | 1.6 ms | 16.4 | 3.4 ms | 1.5 ms | 25.9 | 2.8 ms |
| 50% | 3.0 ms | 42.7 | 8.3 ms | 2.9 ms | 42.0 | 8.6 ms |

*Note: The 90% Settle-time is much lower (about 2 msec).

Referring to Table II above, for the system response to a small signal step of 1.0% (0.3 Deg) of the valve range (30 Deg), the 95% rise time (i.e., the time for the output signal to go from 0 to 95% of the input step), is 1.18 milliseconds (ms), for linear filter, and is 0.89 ms for the non-linear filter system. Thus, the non-linear filter provides a faster time response to a step input than that of the linear filter. Also, for the linear filter, the percent overshoot is 1.16%, and the settle time to get to 95% of the final value is 3.56 ms. For the non-linear filter, the percent overshoot is 1.27%, and the 95% settling time is 8.27 ms.

While the small signal rise time is improved for the non-linear over the linear filter compensation, the non-linear system performance is not degraded for large signal inputs. For the 10% and 50% step inputs, where the system is operating mostly on the limits 20,28 (FIG. 1), the time response is substantially similar for linear and non-linear filter systems, as shown in Table II.

Figure 10:
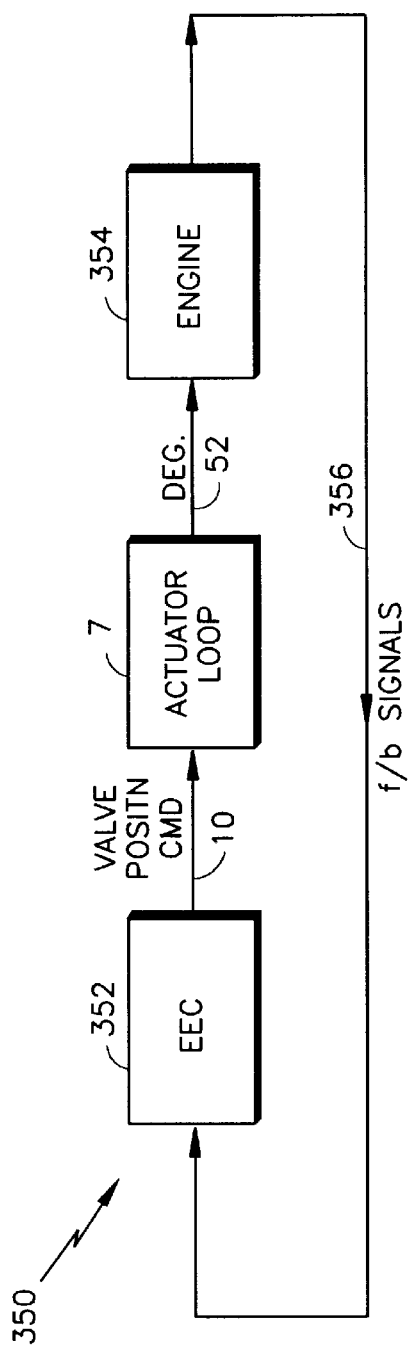
FIG. 10 is a block diagram of an outer control loop which includes the actuator loop of FIG. 1, in accordance with the present invention.

Referring to FIG. 10, another important performance metric for an actuator loop is the closed loop phase lag it introduces over frequency. As is known, the frequency where the phase lag of the closed loop system actuator system (position command to position) is about 15 Deg. is related to the maximum achievable closed loop bandwidth of an outer control loop which incorporates the actuator loop therein.

In particular, the actuator control system 7 (FIG. 1) may be placed in a larger outer control loop system 350 comprising, e.g., an Electronic Engine Control (EEC) 352 comprising gain, dynamic compensation, and other logic which receives signals from an engine 354 (e.g., a gas turbine engine) on lines 356 and provides the valve position command on the line 10 to the actuator loop 7. In that case, the actuator, e.g., a bleed valve actuator, is dispose on the engine 354 so as to bleed air from engine. The loop 7 provides an actuator position (in Degrees) in response to the valve position command input on a line 52 to the engine 354, which alters the engine conditions causing the signals on the lines 356 to the EEC 352 to change. Devices other than an EEC and engine may be substituted for the blocks 352,354 if desired.

The frequency at which the closed loop transfer function of the actuator loop 7 exhibits 15° phase lag is 53 Hz, for linear filters in the loop 7, whereas it occurs at 77 Hz for non-linear filters in the loop 7. Such lower phase lag allows the gain of the EEC to be increased, thereby increasing outer loop closed loop bandwidth.

Further, the frequency at which the closed loop phase lag is 90° is 308 Hz for the linear system 7, whereas it is 447 Hz for the nonlinear system, showing further that there is less phase lag in the nonlinear system. Also, the frequency at which the closed loop gain roll-off is −4.5 dB is 600 Hz for the linear system 7 (corresponding to 132° of phase lag) and 750 Hz for the nonlinear system 7 (corresponding to 114° of phase lag). Further, for an input signal to both systems of an 85 Hz sinusoidal input having an amplitude of 12° peak or 24° (80% of valve full range of 30°) peak-to-peak, the phase lag for the linear system 7 is 24°, whereas the phase lag for the non-linear system 7 is only 16°.

Thus, the control loop 7 employing the non-linear filters described herein exhibits less phase lag, thereby allowing the gain of the EEC 352 to be increased to achieve the same stability margin while providing a faster time response and, accordingly, a wider bandwidth than for the linear filter compensation.

Although the invention has been described as being used within the control system 7 (FIG. 1) having certain exemplary gains, transfer functions, limits, etc., it should be understood that such a system is merely illustrative and that the invention will work equally well with other control systems with resonant modes having other forms than that described herein. Also, there need not be inner and outer loop (position and velocity) feedback signals from the plant 6 to the controller 5. Other feedback signals, more or less feedback signals and more or less loops may be used in the control system 7 if desired. The non-linear filter may be positioned wherever needed to provide improved performance. In particular, the non-linear filter 30 need not be inside an inner loop and need not be in the forward (error) path of the loop, e.g., the filter 30 may be in the feedback path and/or the command signal path if desired to provide improved control performance. Further, there may be none than one non-linear notch filter in various different locations in the controller 5 if desired to provide improved control performance.

Although the invention has been described and illustrated with respect to the exemplary embodiments thereof, it should be understood by those skilled in the art that the foregoing and various other changes, omissions and additions may be made without departing from the spirit and scope of the invention.

We claim:

1. A control system comprising:
a plant having resonant modes; and
a controller which receives a plant output signal and a command signal and provides a controller output signal which controls said plant, said controller comprising:
a non-linear notch filter which provides a filter output signal and receives a filter input signal, said filter input signal being a function of said plant output signal and said command signal, said non-linear notch filter comprising:
linear notch filter logic responsive to said filter input signal and having a linear notch transfer function, which provides a linear notch filtered signal;
zero-cross logic responsive to said filter input signal and said linear notch filtered signal, which monitors said filter input signal and which provides a square wave signal which crosses zero at the same time and in the same direction as said filter input signal and has an amplitude proportional to the value of said linear notch filtered signal when said filter input signal crosses zero;
complementary notch filter logic responsive to said square wave signal and having a complementary transfer function which is complementary to said linear notch transfer function, which provides a complementary notch filtered signal; and
said complementary notch filtered signal and said linear notch filtered signal being added together to provide said filter output signal which exhibits less phase shift between said filter input signal and said filter output signal over certain frequency bands than that of said linear notch transfer function.

2. The control system of claim 1 wherein said complementary notch transfer function comprises a reduced-order transfer function which has a numerator polynomial of a lower order than said denominator polynomial.

3. The control system of claim 1 wherein said zero-cross logic comprises logic which sets said square wave signal amplitude proportional to the absolute value of said linear notch filtered signal when said filter input signal crosses zero from negative to positive and sets said square wave signal amplitude proportional to the negative of the absolute value of said linear notch filtered signal when said filter input signal crosses zero from positive to negative.

4. The control system of claim 1 wherein said amplitude of said square wave signal is equal to the value of said linear filtered signal when said filter input signal crosses zero.

5. The control system of claim 1 wherein said plant comprises an actuator.

6. The control system of claim 1 wherein said actuator comprises a bleed valve actuator.

7. The control system of claim 1 wherein said plant comprises a torque motor, a drive shaft connected to said torque motor, and an actuator connected to said drive shaft.

8. The control system of claim 1 wherein said controller comprises control logic which receives said plant output signal and provides said filter input signal.

9. The control system of claim 1 wherein said controller comprises control logic which receives a command input signal from an electronic engine controller and said plant comprises an actuator disposed on a gas turbine engine.

10. The control system of claim 1 wherein said phase lag of said non-linear notch filter allows for increased responsiveness of the control system.

11. A control system comprising:

plant means having resonant modes; and controller means for receiving a plant output signal and a command signal and for providing a controller output signal which controls said plant, said controller means including non-linear notch filter means for providing a filter output signal and for receiving a filter input signal, said filter input signal being a function of said plant output signal and said command signal, said non-linear notch filter means comprising:

linear filter means responsive to a filter input signal and having a linear transfer function, for providing a linear filtered signal;

zero-cross means responsive to said filter input signal and said linear filtered signal, for monitoring said filter input signal, and for providing a square wave signal which crosses zero at the same time and in the same direction as said filter input signal and has an amplitude proportional to the value of said linear filtered signal when said filter input signal crosses zero;

complementary filter means responsive to said square wave signal and having a complementary transfer function which is complementary to said linear transfer function, for providing a complementary filtered signal; and summing means responsive to said complementary filtered signal and said linear filtered signal for adding together said complementary filtered signal and said linear filtered signal and for providing a filter output signal which exhibits less phase shift between said filter input signal and said filter output signal over certain frequency bands than that of said linear transfer function.

12. The filter of claim 11 wherein said complementary transfer function comprises a reduced-order transfer function which has a numerator polynomial of a lower order than said denominator polynomial.

13. The filter of claim 11 wherein said zero-cross means comprises means for setting said square wave signal amplitude proportional to the absolute value of said linear filtered signal when said filter input signal crosses zero from negative to positive, and for setting said square wave signal amplitude proportional to the negative of the absolute value of said linear filtered signal when said filter input signal crosses zero from positive to negative.

14. The control system of claim 11 wherein said amplitude of said square wave signal is equal to the value of said linear filtered signal when said filter input signal crosses zero.

15. The control system of claim 11 wherein said plant means comprises an actuator.

16. The control system of claim 14 wherein said actuator comprises a bleed valve actuator.

17. The control system of claim 11 wherein said plant means comprises a torque motor, a drive shaft connected to said torque motor, and an actuator connected to said drive shaft.

18. The control system of claim 11 wherein said controller means comprises control logic which receives said plant output signal and provides said filter output signal.

19. The control system of claim 11 wherein said controller means comprises control logic which receives a command output signal from an electronic engine controller and said plant comprises an actuator disposed on a gas turbine engine.

20. The control system of claim 11 wherein said phase lag of said non-linear notch filter means allows for increased responsiveness of the control system.

* * * * *

UNITED STATES PATENT AND TRADEMARK OFFICE
CERTIFICATE OF CORRECTION

PATENT NO.  : 5,929,700
DATED       : Jul. 27, 1999
INVENTOR(S) : James W. Fuller & Carl N. Nett It is certified that error appears in the above-identified patent and that said Letters Patent is hereby corrected as shown below:

Column 14, Claim 19, line 28, "output" should read --input--.

Signed and Sealed this

Seventh Day of December, 1999

Attest:

Q. TODD DICKINSON

*Attesting Officer*    *Acting Commissioner of Patents and Trademarks*